April 15, 1947. W. POLT 2,418,849
TIRE DEMOUNTING DEVICE
Filed Dec. 1, 1943 5 Sheets-Sheet 3

INVENTOR
William Polt
BY Kenyon Kenyon
ATTORNEYS

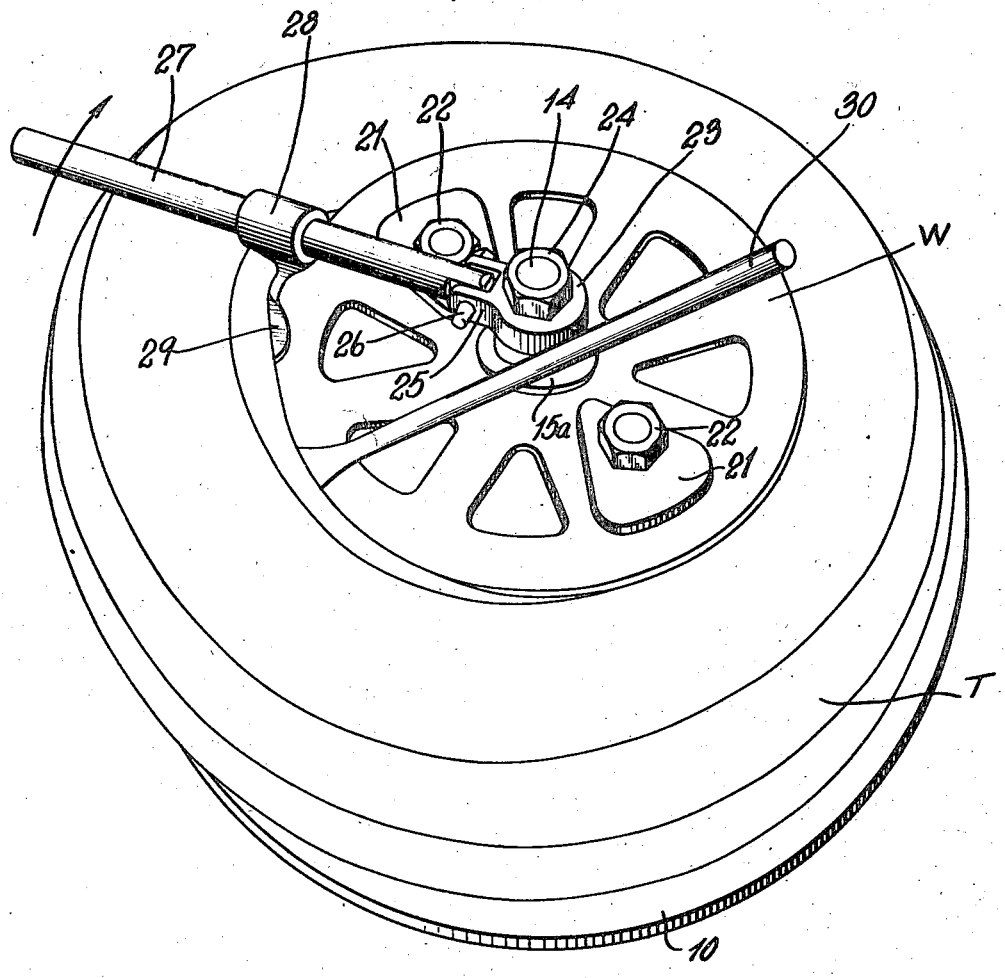

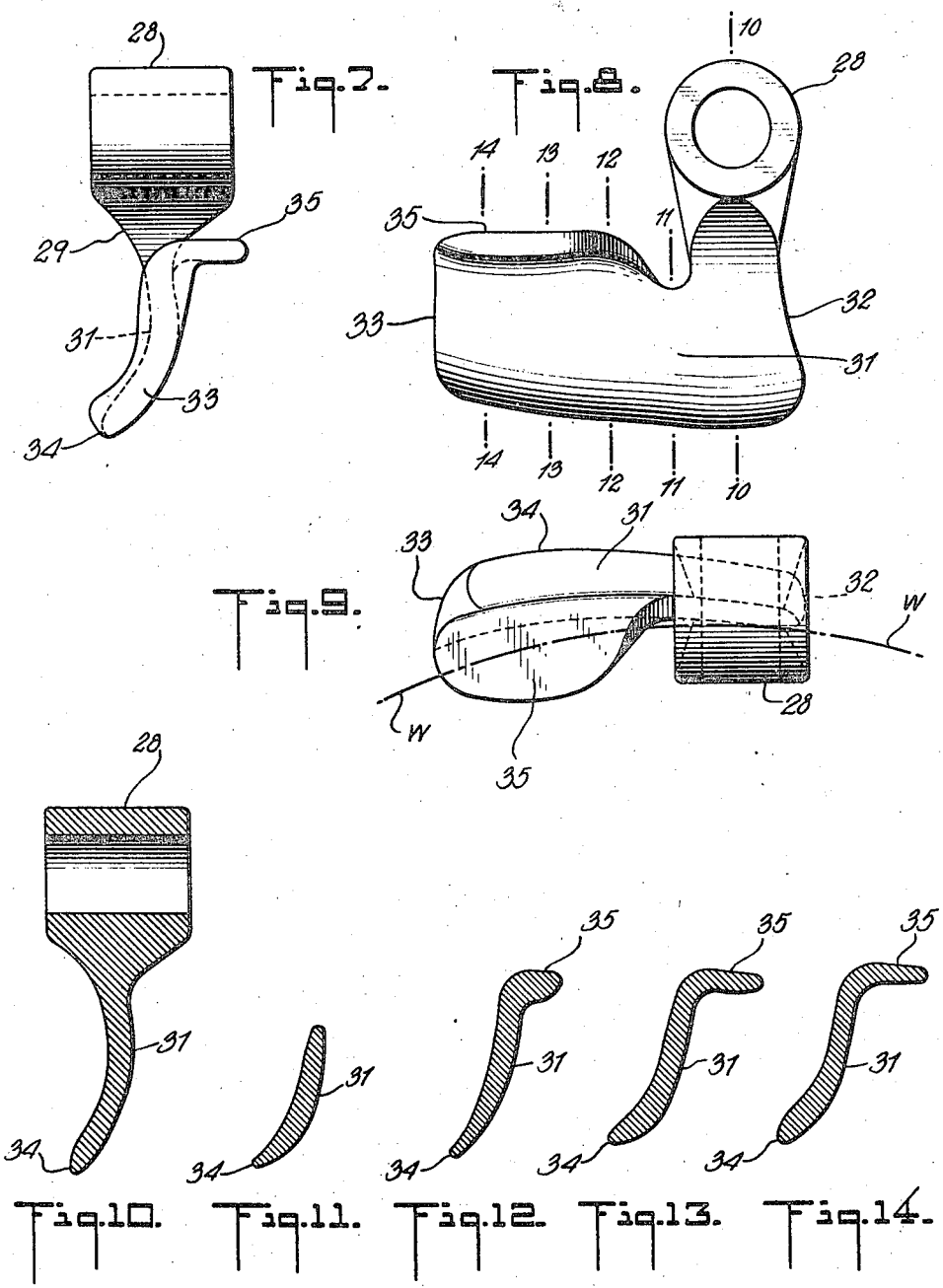

Patented Apr. 15, 1947

2,418,849

UNITED STATES PATENT OFFICE

2,418,849

TIRE DEMOUNTING DEVICE

William Polt, Freeport, N. Y., assignor, by mesne assignments, to E & G Machine and Tool Company, Freeport, N. Y., a partnership consisting of Nicholas Garis and Leo Egoroff, both of Huntington Station, and William Polt, Freeport, N. Y.

Application December 1, 1943, Serial No. 512,410

2 Claims. (Cl. 157—6)

This invention relates to tire demounting equipment and more especially to equipment suitable for use in demounting airplane tires.

Equipment heretofore available for demounting tires from airplane wheels has been of such nature that the tires were subjected to such rough treatment during the demounting operation that very frequently the tires were not further usable. An object of this invention is equipment, by means of which the removal of an airplane tire from its wheel may be accomplished without injury to the tire.

Other objects, novel features and advantages of this invention will become apparent from the following specification and accompanying drawings, wherein:

Fig. 6 is a perspective view illustrating the final stage of the removal of the tire;

Fig. 7 is an end elevation of a part used in the final stage;

Fig. 8 is a side elevation of said part;

Fig. 9 is a plan view of said part; and

Figure 1:
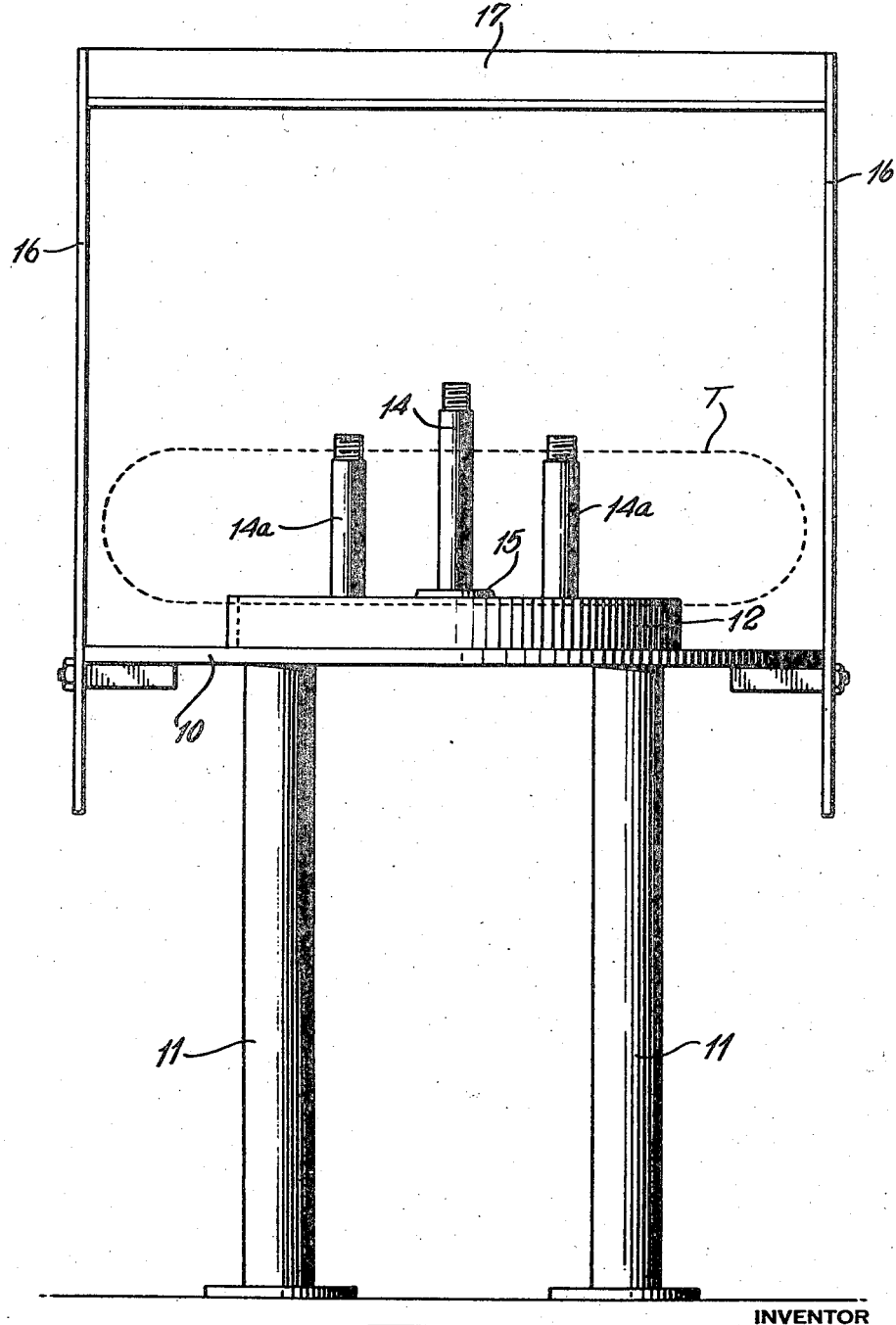
Fig. 1 is an elevation of a stand forming part of the equipment embodying the invention.
Figure 2:
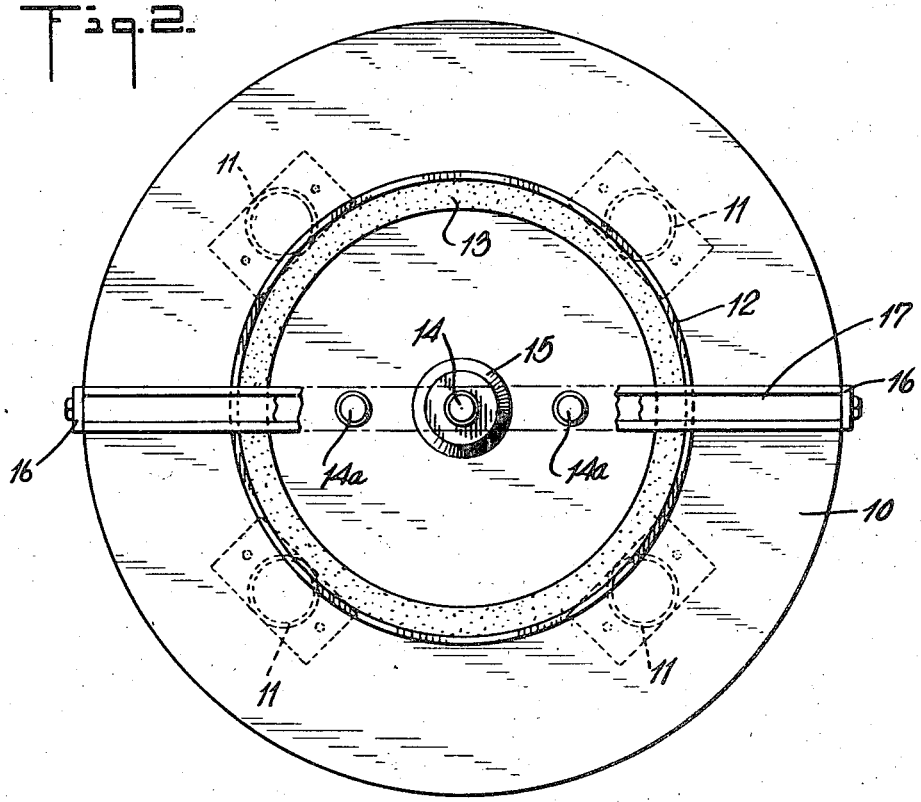
Fig. 2 is a plan view thereof.
Figure 3:
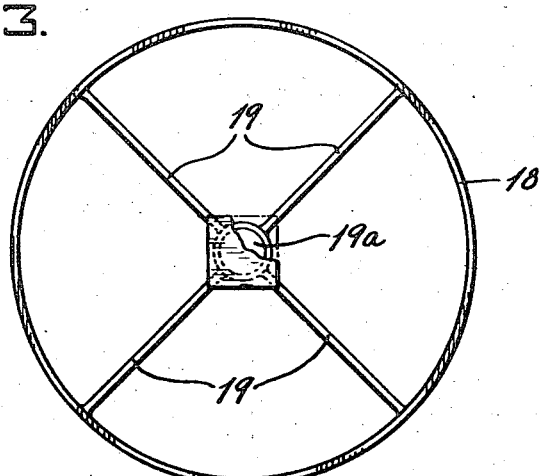
Fig. 3 is a plan view of an element for use with the stand.
Figure 4:
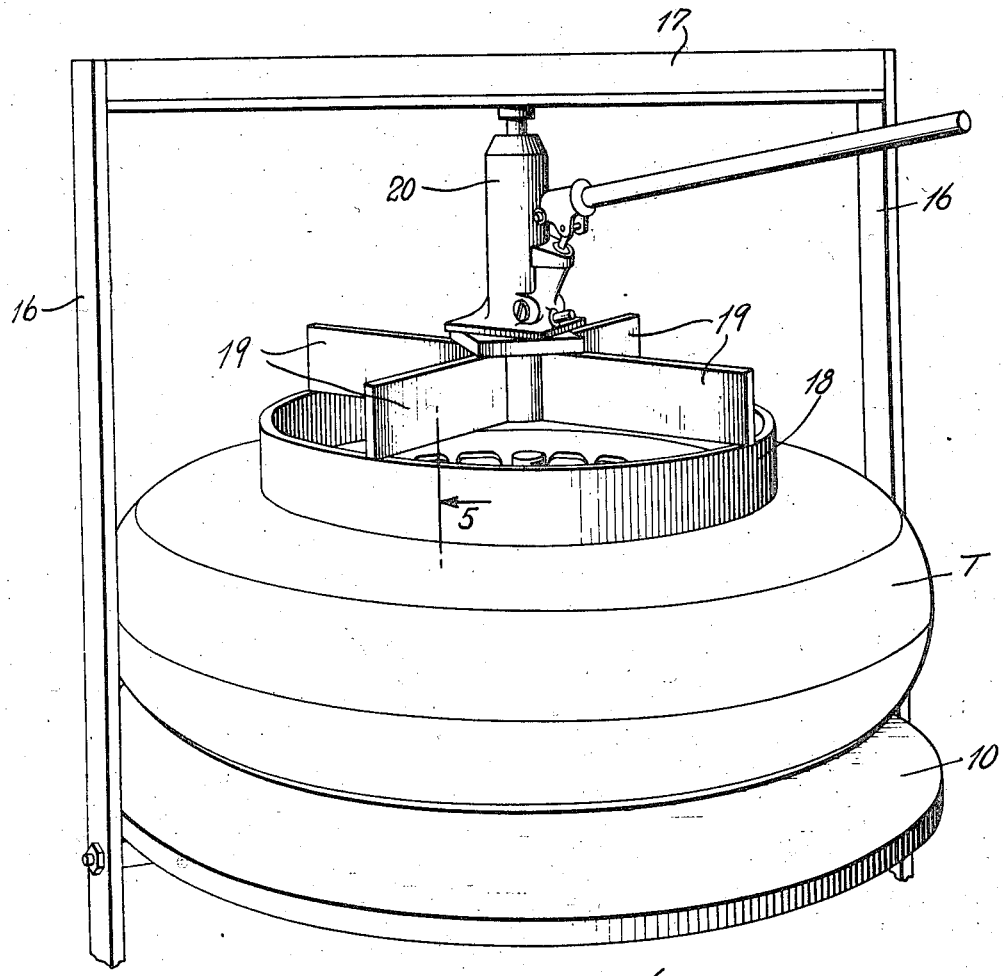
Fig. 4 is a perspective view illustrating the initial arrangement of the equipment for the removal of a tire.

Figs. 10 to 14 inclusive are sections substantially on the lines 10—10, 11—11, 12—12, 13—13 and 14—14 of Fig. 8.

The equipment comprises a metal base 10 mounted on four legs 11. A metal ring 12 is mounted on the upper face of the plate 10 and an annular cushion member 13 rests on the plate 10 within the ring 12. A stud 14 extends upwardly from the plate 10 for some distance above the ring 12 and is arranged axially of the ring 12. Two slightly shorter studs are arranged on opposite sides of the stud 14. On the stud 14 is arranged a cone block 15 which projects slightly above the ring 12. Each of the studs 14 and 14a is threaded at its upper end. A generally rectangular bail 16 is pivotally supported by the plate 10 in such manner that its cross bar 17 overlies the upper end of the stud 14 when the bail is in vertical position.

As a first step in the removal of the tire T from a wheel W, the wheel is placed brake side down over the longer stud 14 with the two other studs coming up between the spokes and with the cone block 15 fitting into the inner bearing race of the wheel. A second cone block 15a is slipped over the stud 14 into the outer bearing race. Next, a second metal ring 18 is placed on the tire. Both the rings 12 and 18 are of slightly larger interior diameter than the outer diameter of the wheel and the ring 18 is provided with cross members 19 having a central recess 19a. A hydraulic jack 20 or other suitable means is interposed between the cross members 19 and the cross member 17 of the bail 16, and is actuated to press the ring 18 downwardly toward the ring 12.

Figure 5:
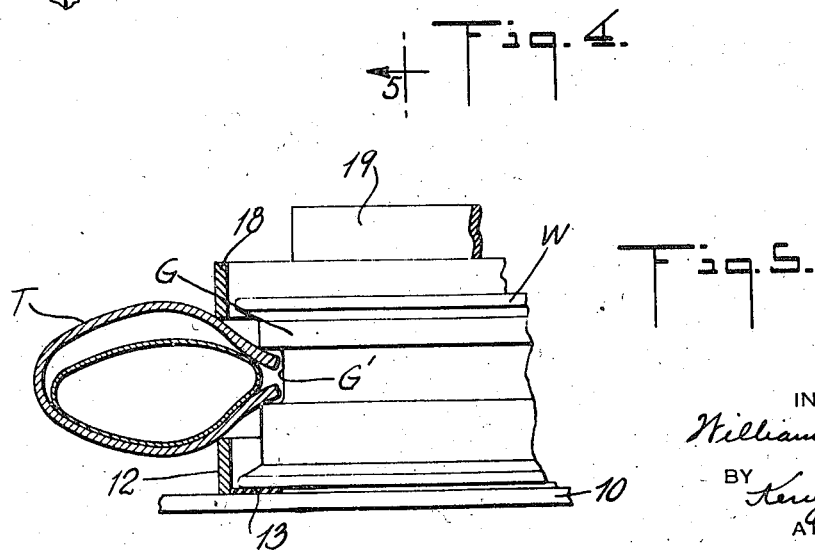
Fig. 5 is a section on the line 5—5 of Fig. 4 illustrating an intermediate stage in the tire removal operation.

Downward movement of the ring 18 causes downward movement of the upper bead of the tire in the wheel rim groove G relative to the wheel as well as downward movement of the wheel relative to the bottom bead to bring both beads into alinement with the well G' in the wheel rim in which position the tire may be shifted laterally slightly with respect to the wheel, (Fig. 5). If the wheel breaks away from the lower bead first, the member 13 cushions the impact of it against the plate 10. When the ring 18 moves down the recess 19a is brought over the upper end of the stud 14. The hydraulic jack and ring 18 are now removed and the bail 16 lowered.

The wheel is now attached to the plate 10 by means of washers 21 arranged on the two studs 14a and held thereon by nuts 22. A collar 23 is slipped over the upper end of the stud 14 and is rotatably held thereon by a nut 24. The collar 23 is equipped with a yoke 25 having a pin 26 extending between the arms thereof. A handle 27 has at one end an aperture to receive the pin 26 to attach the handle thereto for pivotal movement. A sleeve 28 is slidably mounted on the handle 27 and is equipped with a plow member 29.

After mounting the various devices just described, the upper bead of the tire is pried up over the wheel rim at one spot by means of a standard tire tool 30 (Fig. 6) and the bead is held in spaced relation to the side of the wheel while the handle 27 (unattached to the collar 23) and sleeve 28 are properly manipulated to insert the plow member 29 between the bead and the wheel rim. After the plow member has been inserted, the inner end of the handle 27 is placed in the yoke 25 and the pin 26 is passed through the holes in the yoke arms and the handle. Then with the tire tool 30 retained between the rim and the bead, the handle 27 is swung around the stud 14 as an axis. This operation of the handle 27 drags the plow member 29 along the wheel rim and progressively turns the tire bead up over it above the face of the wheel. As the plow member advances the tire tool 30 prevents return into the wheel groove of the tire bead. After about one-half to three-quarters revolution of the handle 27 enough of the bead has been withdrawn from the wheel groove that the tire shifts bodily relative to the wheel thereby permitting easy removal of the remainder of the bead from the wheel groove.

The plow member 29 constitutes a substantially radial extension from the sleeve 28 and comprises a blade 31 of substantially rectangular configuration in elevation and partially overlies the outer periphery of the wheel W. The blade 31 is of generally arcuate contour of greater radius than the wheel periphery so that as shown in Fig. 9, with the leading edge 32 of the blade engaging the outer wheel periphery, the trailing edge 33 of the blade is spaced from the outer wheel periphery and is more distant from the axis of the stud 14 than is the leading edge. The blade 31 curves outwardly as shown in Fig. 7 so that the edge 34 opposite the sleeve is further removed from the axis of the stud than is the edge adjacent the sleeve 28, which edge terminates in a lip 35 riding on the face of the wheel W. As the plow member moves along the rim of the wheel, the blade engages the bead and turns the latter up over the remainder of the plow member and the lip 35 above the face of the wheel. By reason of the trailing edge 33 being spaced from the wheel periphery, the tire bead, once it has ridden up onto the outer surface of the lip 35, cannot slip black in the groove G as might otherwise happen, but instead is caused to engage the face of the wheel at a point inside the periphery thereof.

Alternatively, the plow member may be inserted between the bead and the wheel rim with the collar 23 attached to the handle 27 but detached from the stud 14. After the plow member has been inserted, the handle is manipulated to locate the collar 23 around the stud 14 and the nut 24 screwed on to the stud. The handle 27 is then swung around the stud as an axis as previously described to turn the tire bead by having the plow above the face of the wheel.

It is of course understood that various modifications may be made in the device above described without in any way departing from the spirit of the invention as defined in the appended claims.

I claim:

1. A device of the character described comprising means for supporting a first member for spoke-like rotation about the axis of a wheel having a peripheral groove for receiving a tire, a plow member carried by said first member in overlying relation to the wheel outer periphery and comprising a substantially rectangular blade having a leading edge engageable with the wheel outer periphery and a trailing edge spaced from the wheel outer periphery and having at one remaining edge a lip engaging the face of the wheel and having its fourth edge further removed from the wheel axis than the remainder of said blade.

2. A device of the character described comprising a base having a stud for supporting a wheel having a peripheral groove receiving a tire, a collar rotatably supported by said stud, a handle attached to said collar, a sleeve slidably mounted on said handle, a plow member constituting a continuation of said sleeve and comprising a substantially rectangular blade having a leading edge engageable with the wheel outer periphery and a trailing edge spaced from the wheel outer periphery and having at one remaining edge a lip engaging the face of the wheel and having its fourth edge further removed from the wheel axis than the remainder of said blade.

WILLIAM POLT.

REFERENCES CITED

The following references are of record in the file of this patent:

UNITED STATES PATENTS

| Number | Name | Date |
| --- | --- | --- |
| 1,466,430 | Flick | Aug. 28, 1923 |
| 601,088 | Verel | Mar. 22, 1898 |
| 1,564,496 | Staugaard | Dec. 8, 1925 |
| 1,615,469 | McKenzie | Jan. 25, 1927 |
| 1,863,876 | Renn | June 21, 1932 |
| 1,911,655 | Thomsen | May 30, 1933 |
| 1,025,987 | Long | May 14, 1912 |
| 1,587,634 | Dickey et al. | June 8, 1926 |
| 1,341,727 | Weaver | June 1, 1920 |
| 2,034,819 | Maulis | Mar. 24, 1936 |
| 1,352,722 | Caldwell | Sept. 14, 1920 |
| 2,201,982 | Bazarek | May 28, 1940 |